Mar. 13, 1923. 1,448,406.
C. JABLOW.
CENTERING DEVICE FOR LOCOMOTIVES.
FILED APR. 18, 1922.
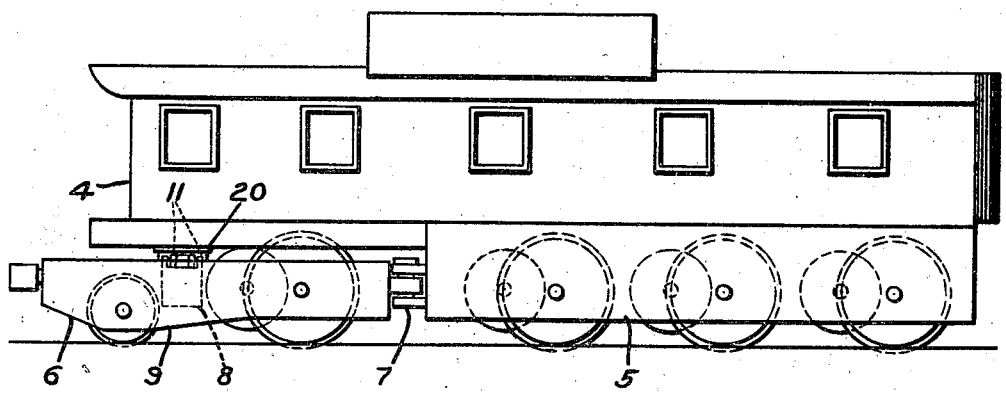
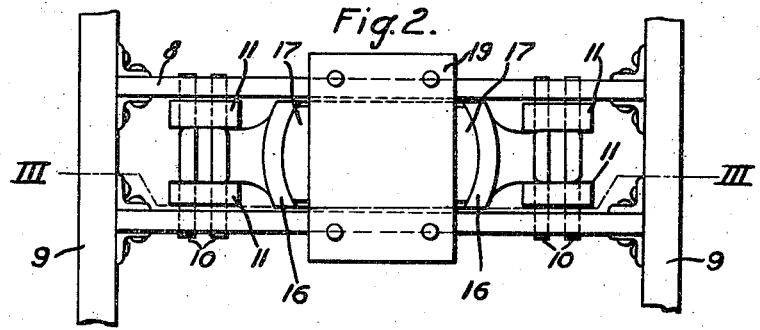
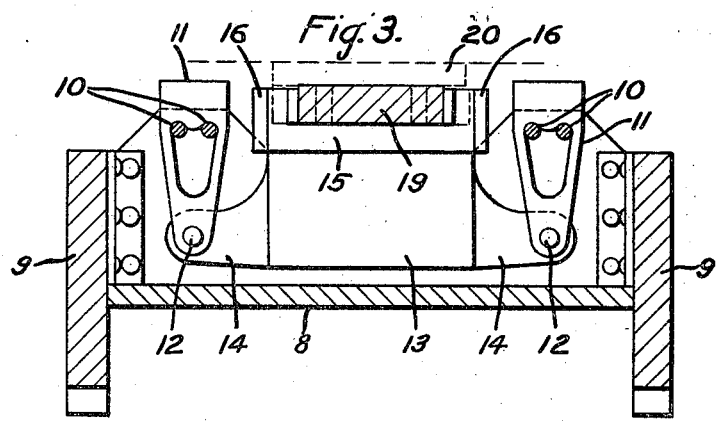
WITNESSES:
R. J. Butler.
A. Martin
INVENTOR
Charles Jablow.
BY
Wesley G. Carr
ATTORNEY Patented Mar. 13, 1923.

1,448,406

UNITED STATES PATENT OFFICE.

CHARLES JABLOW, OF EAST PITTSBURGH, PENNSYLVANIA, ASSIGNOR TO WESTINGHOUSE ELECTRIC & MANUFACTURING COMPANY, A CORPORATION OF PENNSYLVANIA.

CENTERING DEVICE FOR LOCOMOTIVES.

Application filed April 18, 1922. Serial No. 555,341.

*To all whom it may concern:*

Be it known that I, CHARLES JABLOW, a citizen of the United States, and a resident of East Pittsburgh, in the county of Allegheny and State of Pennsylvania, have invented a new and useful Improvement in Centering Devices for Locomotives, of which the following is a specification.

My invention relates to centering devices for locomotives that are provided with articulated trucks.

My invention has for its object the provision of an improved means for centering a locomotive cab upon a radial truck or one of a pair of articulated trucks.

Another object of my invention is to provide a centering device for an articulated truck that will permit relative longitudinal movement between such truck and the cab of the locomotive.

Still another object of my invention is the provision of a centering device particularly applicable to trucks that are provided with swing bolsters, that will maintain the locomotive cab against lateral movement upon such bolster and will permit relative longitudinal movement between the bolster and the cab.

As shown in the accompanying drawings,

Figure 1 is a view, in side elevation, of a locomotive embodying my invention,

Fig. 2 is a plan view of the centering device which I employ, and

Fig. 3 is a view taken on the line III—III of Fig. 2.

The locomotive comprises a body portion 4 that is rigidly secured to a truck 5. For purposes of illustration, I have shown only one-half of a double-end locomotive. It will be understood that the other portion of the locomotive has an articulated connection with that illustrated and is substantially a duplicate thereof, the locomotive consisting of two main trucks and two radial trucks.

A radial truck 6 is joined to the truck 5 by a hinge connection 7 and has rotative movement about said hinge whenever a curve in the truck is encountered. The truck 6 is provided with a pair of side frames 9 to which is secured a cross-tie or transom 8 of U or channel shape.

A pair of pins 10 extend through the sides of the cross-tie 8, adjacent to the upper edges thereof. Each pair of pins 10 serves as a support for a pair of heart links 11. The links 11 are spaced apart, as shown in Fig. 2, and, at their lower ends, carry a pin 12. A swing bolster 13 is provided with perforated extensions 14 that lie between the lower ends of each pair of heart links and are supported by pins 12.

Inasmuch as the cab 4 is rigidly secured to the main frame 5, it will be understood that, as the locomotive encounters a curve and the truck 6 moves about the pivot 7, the front end of the cab 4 and the truck 6 will have relative transverse movement. The cab 4 is supported by the swing bolster 13, and, therefore, causes the links 11 to oscillate upon the pin 10 in the usual manner, to permit relative transverse movement between the cab and the truck, as is common in locomotives employing trucks of the swing bolster type.

The bolster 13, at its upper end, is provided with a bearing surface or center plate 15 that has two flanges 16. A filler block 17 is provided for each of the flanges 16 and may freely turn therein.

A plate 19 is secured to a cross tie 20 that extends across the sills of the locomotive cab and rests upon the bearing surface 15 of the swing bolster 13, between the flanges 16 and filler blocks 17.

When the radial truck is entering or leaving a curve in the track, the plate 19, together with the filler blocks 17, may rotate freely upon the swing bolster 13. The required rotative movement is no greater than the distance between the edges of the plate 19 and the ends of the flanges 16. The distance between the bearing plate 15 and the main truck will vary as the radial truck swings about its pivot 7.

During the swinging movement of the radial truck, the plate 19 slides upon the bolster 13 in a direction longitudinally of the locomotive.

From the foregoing, it will be seen that I provide a centering device that not only is effective as a swivel connection between the cab and the radial truck, but also permits the necessary relative longitudinal movement therebetween.

Various changes in detail and general arrangement may be made without departing from the spirit and scope of the invention, as defined in the accompanying claims.

I claim as my invention:

1. The combination with a locomotive comprising a cab, a main truck and a radial truck, of a swing bolster carried by the radial truck and provided on its upper side with a center plate that has upstanding flanges at its sides, and a bearing plate secured to the bottom of the cab in position to rest upon the center plate, between the said flanges.

2. The combination with a locomotive comprising a cab, a main truck and a radial truck, of a swing bolster carried by the radial truck and provided on its upper side with a center plate that has upstanding flanges of arcuate form at its sides, filler blocks for the said flanges with their outer sides of arcuate form for fitting into the arcuate flanges and their inner sides normally parallel to the longitudinal center line of the cab, and a bearing plate secured to the bottom of the cab in position to rest upon the center plate between the said filler blocks.

3. The combination with a vehicle comprising a body and an articulated truck, of a swing bolster carried by the truck and a swivel connection between the bolster and the vehicle body provided with means for preventing relative movement of the bolster and the body laterally but permitting relative movement thereof longitudinally.

4. The combination with a locomotive comprising a cab and an articulated truck, of a centering device for the truck comprising a supporting plate, side members of arcuate form, disposed in a horizontal plane, a filler block for each of the side members, and a bearing plate loosely supported between the filler blocks, the filler blocks at their outer sides being of arcuate form and having straight inner sides abutting the adjacent edges of the said bearing plate.

5. The combination with a locomotive comprising a cab, a main truck and a radial truck, of a swing bolster carried by the radial truck and provided on its upper side with a centering device that embodies means for preventing relative transverse movement between the cab and the bolster, but which permit relative longitudinal movement therebetween.

In testimony whereof, I have hereunto subscribed my name this 17th day of April, 1922.

CHARLES JABLOW.